United States Patent

[11] 3,617,380

[72] Inventor Hirosi Usui
 Tokyo, Japan
[21] Appl. No. 721,762
[22] Filed Apr. 16, 1968
[45] Patented Nov. 2, 1971
[73] Assignee Kabushiki Kaisha Ricoh
 Tokyo, Japan

[54] POLYVINYL CHLORIDE SUPPORTS FOR USE AS THE BASE OF MAGNETIC RECORDING MATERIALS
 3 Claims, 3 Drawing Figs.
[52] U.S. Cl. .................................... 117/235,
 117/138.8, 117/161, 161/162, 161/165
[51] Int. Cl. ...................................... B32b 5/16,
 G11b 5/70
[50] Field of Search .......................... 161/165,
 162; 117/235, 138.8 U, 161 A; 260/876, 891

[56] References Cited
UNITED STATES PATENTS

| | | | |
|---|---|---|---|
| 2,802,809 | 8/1957 | Hayes ........................... | 260/876 |
| 2,803,621 | 8/1957 | Schwartz et al. ............... | 260/891 |
| 3,163,683 | 12/1964 | Salyer et al. .................. | 260/891 |
| 3,367,997 | 2/1968 | Smith ........................... | 260/891 |
| 3,470,021 | 9/1969 | Hendricx et al. .............. | 117/235 |
| 3,490,945 | 1/1970 | Slovinsky ..................... | 117/235 |

Primary Examiner—John T. Goolkasian
Assistant Examiner—George W. Moxon, II
Attorney—Woodhams, Blanchard and Flynn ABSTRACT: A sheet-, card- or tape-form support for use as the base of a magnetic recording material, comprising a polyvinyl chloride base containing, dispersed therein, an acrylonitrile-butadiene-styrene copolymer or an acrylonitrile-butadiene copolymer in an amount ranging from 3 to 30 percent by weight of said polyvinyl chloride.

POLYVINYL CHLORIDE SUPPORTS FOR USE AS THE BASE OF MAGNETIC RECORDING MATERIALS

BACKGROUND OF THE INVENTION

1. Field of the Invention

The present invention is concerned with a support for use as the base of a magnetic recording material, comprising a polyvinyl chloride base containing, uniformly dispersed therein, a acrylonitrile-butadiene-styrene copolymer (hereinafter to be referred to simply as ABS resin) or an acrylonitrile-butadiene copolymer (hereinafter to be referred to simply as NBR).

2. Description of the Prior Art

In the past, the supports which constituted the base of the tapes designed for use on tape recorders, or the supports which were the base of recording sheets of computation cards, all of which were made by the application of the principles of magnetism, have been manufactured mostly with either paper or with relatively expensive plastic materials, such as polyester and cellulose triacetate and they were molded into either tape, sheet or card shape.

Supports made with such materials as paper had the drawbacks that they were of limited mechanical strength and that their dimensions would easily alter to a considerable extent due to changes in the humidity of the ambient atmosphere. These paper supports, however, were utilized widely because of one advantageous reason that they were available at low cost. On the other hand, tapes, cards or the like made of paper materials and intended for use as the base to be coated with a magnetic material to produce a recording material, would frequently develop troubles during use, owing to the aforesaid drawbacks. Also, such material as the aforesaid polyester was too expensive to be used as such support, and besides, the polyester has been limited to only those supports of an extremely small thickness. For this reason, supports made with the polyester in either sheet or card form were so excessively soft and elastic that they were found to be quite inconvenient in practical use. Furthermore, supports made with cellulose triacetate had drawbacks similar to those of polyester supports, and in addition, they have the further shortcoming that they would undergo substantial dimensional changes due to fluctuations in the temperature of the ambient atmosphere. However, there has not been proposed or developed to date a satisfactory material which can be used as a substitute for those known base materials of magnetic recording materials.

SUMMARY OF THE INVENTION

It is, therefore, an object of the present invention to provide a support which is made with a plastic material and which is used as the base of a magnetic recording material and which is extremely low in manufacturing cost.

Another object of the present invention is to provide a support for use as the base of a magnetic recording material which exhibits a highly increased impact value and which develops hardly any change in its hardness and dimensions when it is subjected to changes in the temperature and the humidity of the ambient atmosphere.

The support of the present invention employs, as its basic component, polyvinyl chloride which is available at a very low cost price. The support of the present invention is prepared by mixing and dispersing, in this polyvinyl chloride, an ABS resin or an NBR which has a plasticizing property so as to substantially reduce the coagulation of the molecules of polyvinyl chloride when the plasticizer is mingled between said molecules, and then molding the resulting mixture into as appropriate shape, such as sheet-, card- or tape-form, to thereby prepare supports which are suitable for use as the base of magnetic recording materials.

Vinyl chloride resin, in general, possesses the drawbacks that it has such a small mechanical strength that it undergoes a change in its dimensions upon the application of a very trifling impact or stress thereto, or that it is very sensitive to changes in the temperature of the ambient atmosphere so that its hardness will undergo substantial changes due to fluctuations in the ambient temperature, or that it will develop an uneven surface or wavy configuration when it is exposed to an elevated temperature, say at about 30° C., after it is molded into a shaped product, with the result that no support which is good in shape and which has precise dimensions can be obtained. For the foregoing reason, vinyl chloride resins have not been given any consideration at all as the base for use in magnetic recording materials. On the other hand, vinyl chloride resins are roughly divided into two categories, namely, hard vinyl chloride and soft vinyl chloride. In case, for example, a hard vinyl chloride which contains hardly any plasticizing agent is molded into a support for a magnetic recording material, its mechanical properties will acquire a specific orientation at the time it is molded, in such a way that its mechanical strength in the direction in which it has been molded will differ markedly from the mechanical strength in the direction perpendicular thereto. Moreover, such vinyl chloride will have an uneven surface at many places of the support. Therefore, it has been impossible to use hard vinyl chloride which contains substantially no plasticizer as the material of supports for employment in magnetic recording materials. On the other hand, a soft vinyl chloride containing an oily plasticizer such as dioctylphthalate (hereinafter to be referred to simply as DOP) or dibutylphthalate (hereinafter to be simply called as DBP) has the drawback that the magnetic recording material made with a magnetic material coated on a support consisting of such a soft vinyl chloride will develop, in summer time, the diffusion and infiltration of the plasticizer into the layer of the magnetic material coated on the support, resulting in a deterioration of the magnetic recording properties of the product. For this reason, this soft vinyl chloride containing an aforesaid plasticizer could not have been employed as the base material of the supports of magnetic recording materials.

The inventor has discovered that by including in polyvinyl chloride, in the dispersed state, an acrylonitrile resin, especially an ABS resin which is a copolymer of acrylonitrile, styrene and butadiene, or a resinous substance of a high molecular weight such as NBR which is a copolymer of acrylonitrile and butadiene, in lieu of using a plasticizer such as DBP or DOP, and then shaping the resulting mixture into either sheet, card or tape shape, there is obtained a support of a magnetic recording material which is free of the various drawbacks of the conventional supports.

The ABS resin which can be applied to the present invention includes all of those which are manufactured according to various manufacturing methods. However, those ABS resins wherein the acrylonitrile-butadiene-styrene mole ratio is such that the content of acrylonitrile is in the range of from 5 to 30 moles and the content of butadiene is in the range of from 10 to 40 moles, both per 1 mole of styrene, are especially suitable for use in the present invention.

ABS resins have been manufactured according to the following methods. For example, there is the grafting method (developed by Marbon Chem. Co. of U.S.A.) according to which two kinds of monomers, i.e. polybutadiene latex prepared by emulsion polymerization and styrene are mixed together and the mixture is subjected to graft polymerization in an emulsified state; and there is the polymer blending method (developed by Naugatuck Chem. Co. of U.S.A.) which is featured by mixing two kinds of latexes, namely, a synthetic nitrilobutadiene rubber (NBR) and a styreneacrylonitrile copolymer; and also there is a graft-blend complex method (developed by Monsanto Chem. Co. of U.S.A.) in which local graft polymerization is allowed to progress while a styrene-butadiene copolymer is being mixed with a styrene-acrylonitrile copolymer. All of those ABS resins which are manufactured according to these known prior methods are suitable for use in the present invention. In Japan, there are available ABS resins which are sold under the trade names of JFR-ABS, Kane-Ace and Stylac.

As the so-called nitrilobutadiene rubbers which are butadiene-acrylonitrile copolymers, there have been made those having, in general, a butadiene-to-acrylonitrile mole ratio of 2:1 and those of a mole ratio of 3:1. Those made by, for example, Goodyear Tire and Rubber Company of U.S.A.; B. F. Goodrich Chem. Co. of U.S.A.; British Geon, Ltd. of Great Britain; Firestone Tire and Rubber Company of U.S.A.; and Farbenfabriken Bayer A.G. of West Germany, can be equally satisfactory applied to the present invention. NBRs which are marketed in Japan bear the commercial names of Hycar, Chemigum and Butakon.

According to the present invention, the amount of the resinous substance having a high molecular weight, such as the aforesaid ABS resin and NBR, which is contained in dispersed state in polyvinyl chloride is desirably in the range of from 3 percent to 30 percent by weight relative to polyvinyl chloride. For example, polyvinyl chloride containing 20 percent by weight of an ABS resin exhibits an impact value, on Charpy impact test, which is about four times as great as that exhibited by polyvinyl chloride not containing the aforesaid resin. Also, the degree of the dimensional change which the former undergoes when exposed to a change in the temperature of the ambient atmosphere of from 10° to 30° C. is reduced to less than one-half of that exhibited by the latter. Furthermore, the former shows a marked reduction in the amount of changes in hardness (on Clark's hardness test) which are caused by the fluctuations in the temperature of the ambient atmosphere, as compared with the latter. Thus, polyvinyl chloride containing the aforesaid amount of ABS resin possesses properties which are quite suitable for use as the supports of magnetic recording materials which may be either in the sheet-, card- or tape-form and which are required to have very high dimensional precision standard. While there is placed no particular limitation on the thickness of the support in the present invention, it is desirable to produce supports having a thickness ranging from $50\mu$ to $200\mu$. Also, it is to be noted that the inclusion of the aforesaid resinous substances of a high molecular weight in a polyvinyl chloride base in an amount of more that 30 percent by weight relative to the latter will not enable one to expect any great correspondingly improvement in their properties, in proportion to the amount of such resinous substances included. The inclusion of such a large amount of resinous substances as mentioned above will result, on the one hand, in that one of the objects of the present invention to provide a support of a magnetic recording material at low cost is hampered, and will also injure the desirable resiliency of the supports produced. It is, therefore, desirable to limit the amount of the resinous substances of high molecular weight which are contained in polyvinyl chloride to 30 percent or less by weight. The manufacturing cost of the supports of the present invention which are produced from such a proportion of the components is about one fifth of the cost of the conventional supports which are made with polyester or cellulose triacetate. It is also to be noted that the sheets, tapes and cards for use in magnetic recording which employ the supports of the present invention not only allow the magnetic materials to satisfactorily adhere to the supports but also will bring about the following desirable effect that, owing to the fact that no element which will serve to deteriorate the magnetic recording ability of the product in contained, the product of the present invention will be able to constantly preserve the predetermined magnetic recording ability for a very long period of time. In addition, the supports of the present invention are extremely superior for use as the base of the magnetic recording materials in that the supports will never be easily broken or damaged by the application of bending force or impact externally thereto.

DESCRIPTION OF THE PREFERRED EMBODIMENTS

EXAMPLE 1

In polyvinyl chloride was dispersed an ABS resin manufactured by Asahidow Chemical Co. and sold under the trade name of Stylac in amounts of 5 percent, 10 percent, 15 percent, 20 percent and 30 percent by weight, respectively. The resulting respective mixtures were molded into sheets having a thickness of $100\mu$. Thus, five kinds of supports which were different from each other in the amount of the ABS resin content and which were for use as the base of magnetic recording materials were obtained.

One surface of the sheet-form support containing 15 percent by weight of ABS resin was coated with a magnetic material (a paste of $\gamma$-$Fe_2O_3$, methyl ethyl ketone and a SBR resin (styrene-butadiene rubber), and thus a magnetic recording sheet was prepared. This recording sheet was then subjected to a recording process at 10° C., and was played back at 35° C. It was noted that the sound had been quite clearly recorded, and no disorder was present when played back.

Figure 1:
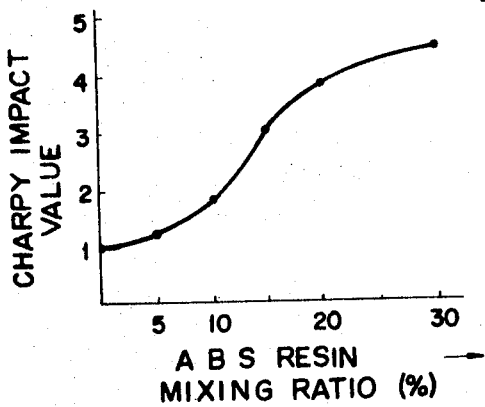
FIG. 1 is a chart of a curve showing the relation between the changes in the value of the Charpy impact test conducted on the supports of the present invention for use as the base of a magnetic recording material and the amount of the ABS resin which is contained, in dispersed state, in said supports.

The sheet-form supports of the present invention prepared in the manner described above were each given a Charpy impact test at 20° C. to determine their impact values. On the other hand, the impact values of control sheets made with only polyvinyl chloride and containing no ABS resin were measured in the same way. Using the latter value as the arbitrary reference value 1, the impact values of the supports of the present invention were entered graphically, and a curve as shown in FIG. 1 was obtained. In this FIG. 1, the vertical axis represents Charpy impact values of the supports measured in the manner as described above, while the horizontal axis is given graduations indicating the mixing ratio of the ABS resin to show how the impact values of the supports change in accordance with an increase in the mixing ratio of the ABS resin.

As is clearly noted from FIG. 1, the impact value shows a sharp increase with those supports whose ABS resin mixing ratio if 5 percent or more by weight. Those supports whose ABS resin mixing ratio is 20 percent or more by weight show that their impact values approach closer to the maximum.

Figure 2:
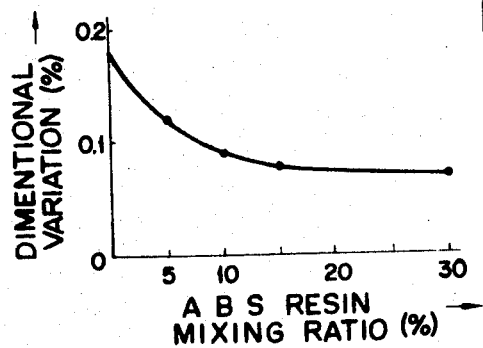
FIG. 2 is a chart of a curve showing the relation between the amount of the ABS resin contained in said supports and the dimensional changes of the same caused by the fluctuations in the temperature of the ambient atmosphere.

Furthermore, the percentages of the changes in the dimensions of the supports of the present invention and the control supports due to changes in the temperature from 10° C, to 30° C. were measured, and the result was entered in a graph. Thus, a curve as shown in FIG. 2 was obtained. As will be noted clearly from FIG. 2, there takes place a sudden drop in the percentage of the dimensional change in those supports containing an ABS resin in amounts of 5 percent or more by weight. Those whose ABS resin mixing ratio is 15 percent or more by weight show substantially no dimensional changes.

Figure 3:
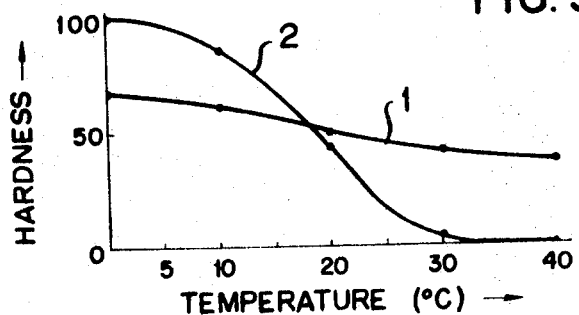
FIG. 3 is a chart of curves for comparison of the changes in the hardness of the supports of the present invention due to fluctuations in temperature with such changes noted in the supports made with ordinary polyvinyl chloride containing no ABS resin.

Furthermore, the supports of the present invention containing an ABS resin in an amount of 15 percent by weight and the control supports made with polyvinyl chloride and containing dioctylphthalate in an amount of 15 percent by weight were both subjected to temperature changes from 0° C, to 40° C. to measure the changes in their hardness. The result is as shown in FIG. 3. FIG. 3 contains a vertical axis which is provided with graduations indicating Clark's hardness and also contains horizontal axis provided with graduations indicating the temperatures. The graduations of hardness were made by using the reference of hardness of the control support at 0° C. as being 100, and the hardness at 40° C. as being zero. The values of hardness measured at the respective temperatures were plotted correspondingly against the aforesaid graduations of said control support. In FIG. 3, the curve 1 represents the values of the support of the present invention, whereas the curve 2 represents those of the control support. As will be noted from the curve 1 in FIG. 3, the support of the present invention is noted to undergo hardly and change in its hardness even when it is exposed to changes in the temperature of the ambient atmosphere and also to preserve substantially an appropriate hardness constantly. Although not shown in the drawing, the supports of the present invention showed only a negligible amount of changes in dimensions even when they were exposed to changes in the humidity of the ambient atmosphere. In contrast, to this, however, the control supports made with only polyvinyl chloride and containing no ABS resin showed drastic changes in both the hardness and dimensions caused by changes in the temperature of the ambient atmosphere.

As has been stated above, the present invention provides supports of magnetic recording materials, which are of excellent properties and abilities such that they exhibit a markedly improved impact valve and that they undergo practically no changes in both dimension and hardness even when they are exposed to fluctuations in both the temperature and humidity of the ambient atmosphere.

EXAMPLE 2

Into polyvinyl chloride was dispersed 10 percent by weight of an ABS resin (made and sold by Asahidow Chemical Co. and under the trade name of Stylac and having an acrylonitrile-butadiene-styrene polymerizing ratio of 25:30:45). In a known manner, the mixture was molded into a tape-shape having thickness of 60μ, and thus a tape-form support of a magnetic recording material was obtained. For comparison, a control support of a shape similar to that of the product of the present invention was prepared by the use of a vinyl chloride resin containing a plasticizer consisting of dibutylphthalate. Recording was conducted on these two tapes by the use of a commercially available tape recorder, and the recorded two tapes were played back several times repeatedly. While no disorder was noted of the recorded tape in which the support of the present invention was used, the recorded control tape developed curls during the playback performance and also developed deformation, and thus this control tape could not stand repeated use.

EXAMPLE 3

Into polyvinyl chloride was dispersed 10 percent by weight of an acrylonitrile-butadiene copolymer (having an acrylonitrile-butadiene mole ratio of 33:67) and manufactured and sold under the trade name of Butakon by ICI). By processing the resulting mixture in a manner similar to that described in example 2, a tape-form support of a magnetic recording material was prepared. The properties of the recording tape obtained from the use of this tape-form support were noted to be substantially the same with those of the product of the present invention which was obtained in example 2.

What is claimed is:

1. A magnetic recording material comprising a support having a thickness in the range of from 50 μ to 200μ and consisting essentially of polyvinyl chloride containing, uniformly dispersed therein, from 3 to 30 percent by weight of a copolymer selected from the group consisting of acrylonitrile-butadiene-styrene copolymer and acrylonitrile-butadiene copolymer, and a magnetic recording layer coated on one surface of said support.

2. A magnetic recording material according to claim 1, wherein said magnetic recording layer consists of a mixture of $\gamma$-$Fe_{23}$ particles and styrene-butadiene rubber.

A support according to claim 1, wherein the mole ratio of the components of said acrylonitrile-butadiene-styrene copolymer is such that the content of acrylonitrile is in the range of from 5 moles to 30 moles and the content of butadiene is in the range of from 10 moles to 40 moles, both with respect to one mole of styrene, and wherein the mole ratio of the components of said acrylonitrile-butadiene copolymer is such that the content of butadiene is in the range of from 2 moles to 3 moles relative to one mole of acrylonitrile.

* * * * *